(No Model.)

J. H. HILL.
Hame Fastener.

No. 242,645. Patented June 7, 1881.

Witnesses:
Franck L. Ourand
H. Aubrey Tanlmin

Inventor:
Justin H. Hill
By Alexander & Mason,
Attys. per O.

UNITED STATES PATENT OFFICE.

JUSTIN H. HILL, OF CHICAGO, ILLINOIS.

HAME-FASTENER.

SPECIFICATION forming part of Letters Patent No. 242,645, dated June 7, 1881.

Application filed November 12, 1880. (No model.)

*To all whom it may concern:*

Be it known that I, JUSTIN H. HILL, of Chicago, in the county of Cook, and in the State of Illinois, have invented certain new and useful Improvements in Hame-Fasteners; and I do hereby declare that the following is a full, clear, and exact description thereof, reference being had to the accompanying drawings, and to the letters of reference marked thereon, making a part of this specification.

The nature of my invention is the construction of a hame-fastening of two hooked bars, one of which is provided with a series of inclined or beveled openings, and the other with a hooked fang or tooth, which is adapted to catch in the openings, the two bars being secured in position and held by means of a thumb-screw, all as hereinafter set forth.

To enable those skilled in the art to make and use my invention, I proceed to describe its construction and operation.

Figure 1:
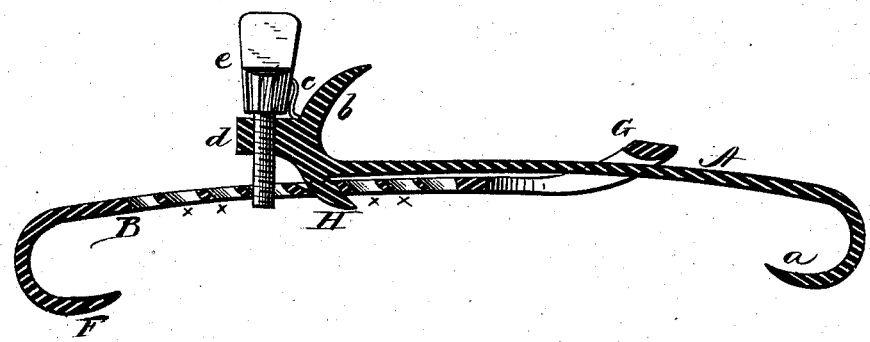
Figure 2:
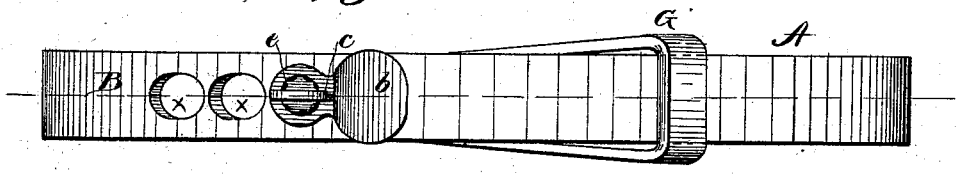
Figure 3:
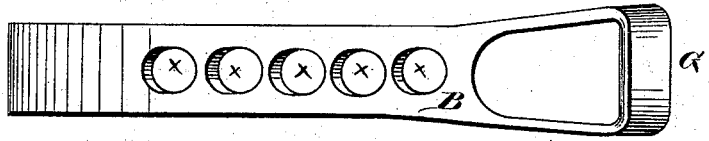

In the annexed drawings, making part of this specification, Figure 1 represents a longitudinal section; Fig. 2, a plan view, and Fig. 3 a plan view of one of the bars detached.

In the figures, A represents a bar made of flat metal, which has a hook, $a$, formed at its outer end. At its other end it is provided with an extension-piece, $d$, a hooked tooth, H, and a finger-piece, $b$.

B represents a second bar, which is also provided at one end with a hook, F, and with a series of openings, $x$ $x$, from near one end to near the other, and also with a loop or keeper, G. The bar A is passed through the keeper and fits snugly against the bar B, both being slightly curved. The openings in the bar B are peculiarly made, being cut through or formed in a slanting or inclined manner, the slant being toward the loop end of the bar. The tooth upon bar A has a hooked shape, so that when its point is inserted in one of the openings it draws slightly toward the loop end of the other bar, and thus said point catches under the opposite side of the opening. The extension-piece $d$ is provided with a thumb-screw, $e$. The threaded end of this screw passes into one of the openings $x$, and the sharp portions of the metal formed on the bar by beveling the openings catch into the threads and serve to retain it in position. After the tooth is once inserted in the opening in plate B the screw is caused to enter another of the openings. By turning the screw the plates are clamped together and the tooth is firmly secured in position. The two hooks $a$ and F are caught in the eyes of the hames, and then by the adjustment of the hook H and the screw $e$ the ends of the hames are held in the position desired.

I may have a slot cut in the bar A, and a screw in the bar B which passes through said slot, for confining the bars together. It is evident that this slight modification could be used in place of the one represented in the drawings.

The thumb-piece $b$ is for the purpose of assisting in the facility of working the parts.

A small spring, $c$, is used and secured upon extension-piece $d$, which enters serrations or grooves in the upper portion of the screw to prevent it from unturning and loosening the parts unintentionally.

Having thus fully described my invention, what I claim as new, and desire to secure by Letters Patent, is—

The plate A, provided with hook $a$, hooked tooth H, and extension $d$, with its screw $e$, in combination with the plate or bar B, provided with hook F, and inclined openings $x$ $x$, substantially as and for the purpose set forth.

In testimony that I claim the foregoing I have hereunto set my hand this 26th day of October, 1880.

JUSTIN H. HILL.

Witnesses:
 J. J. McCARTHY,
 WILLIAM G. WITHERELL.